United States Patent [19]

Miura

[11] Patent Number: 4,670,033

[45] Date of Patent: Jun. 2, 1987

[54] METHOD OF CONSOLIDATING FINE PORES OF POROUS GLASS

[75] Inventor: Kyo Miura, Tokyo, Japan

[73] Assignee: Canon Kabushiki Kaisha, Tokyo, Japan

[21] Appl. No.: 807,971

[22] Filed: Dec. 12, 1985

[51] Int. Cl.$^4$ ............... C03C 21/00; C03B 37/025
[52] U.S. Cl. .................... 65/3.15; 65/3.14; 65/22; 65/30.13; 65/31; 65/60.7; 65/60.8
[58] Field of Search ............ 65/3.15, 2, 18.4, 22, 65/60.51, 60.52, 31, 3.14, 60.8, 60.7, 30.13

[56] References Cited

U.S. PATENT DOCUMENTS

| | | | |
|---|---|---|---|
| 4,014,772 | 3/1977 | Woods et al. ............ | 65/30.1 X |
| 4,110,093 | 8/1978 | Macedo et al. .......... | 65/3.15 |
| 4,157,253 | 6/1979 | Hernqvist ................ | 65/30.1 X |
| 4,302,231 | 11/1981 | Macedo et al. .......... | 65/3.15 |
| 4,389,233 | 6/1983 | Kurosaki et al. ........ | 65/3.15 X |
| 4,493,720 | 1/1985 | Gauthier et al. ........ | 65/3.15 X |
| 4,566,889 | 1/1986 | Schmadel ................ | 65/3.15 |

FOREIGN PATENT DOCUMENTS 7507164 10/1976 Fed. Rep. of Germany ....... 65/3.14

*Primary Examiner*—Robert Lindsay
*Attorney, Agent, or Firm*—Fitzpatrick, Cella, Harper & Scinto

[57] ABSTRACT

A method of consolidating fine pores of a porous glass by impregnating the fine pores with an energy decomposable compound exemplified by $SiH_4$. Energy is applied to the decomposable compound thereby forming active species which bond with each other and the functional groups on the surface of the fine pores three-dimensionally to thus form a glass network structure in the pores.

15 Claims, No Drawings

METHOD OF CONSOLIDATING FINE PORES OF POROUS GLASS

BACKGROUND OF THE INVENTION

1. Field of the Invention

This invention relates to a method of consolidating fine pores of porous glass.

2. Description of the Prior Art

For the purpose of imparting functionality to porous glass, methods for impregnating fine pores of porous glass with various materials have been proposed. Except that the porous glass is used with the remaining pores, a consolidation treatment is applied, in general, so as to render the function everlasting.

Heretofore, the consolidation of fine pores of porous glass is usually effected by heating, and it is known to be powerful.

However, the previously imparted function is often lowered or eliminated disadvantageously by heating at a high temperature required for the consolidation treatment. The heating for pore consolidation at high temperature has disturbed markedly to impart a function to porous glass. In addition, according to prior art treating methods, there is a problem that the shape of porous glass varies by the treatment.

SUMMARY OF THE INVENTION

An object of the present invention is to provide a method of effectively consolidating pores of porous glass free from drawbacks of prior art consolidation of pores by heating at high temperature, and in particular, the method being effective where consolidation by heating at high temperature can not be applied.

Another object of the present invention is to provide a method of partially consolidating fine pores of porous glass.

According to one aspect of the present invention, there is provided a method of consolidating fine pores of porous glass which comprises impregnating fine pores of porous glass with a decomposable compound to form a glass network structure expanded three-dimensionally in the fine pores.

According to another aspect of the present invention, there is provided a method of consolidating fine pores of porous glass which comprises impregnating fine pores of porous glass with an energy decomposable compound. Applying an energy to the decomposable compound to generate active species from it, the active species thus formed are bonded with each other and with the functional groups on the surface of the fine pores three-dimensionally to form a glass network structure in the pores.

According to a further aspect of the present invention, there is provided a method of consolidating fine pores of porous glass which comprises impregnating fine pores of porous glass with a silicon compound having an

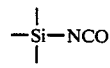

bond and decomposing the silicon compound in the pores.

DESCRIPTION OF THE PREFERRED EMBODIMENTS

According to the present invention, the method of consolidating fine pores is carried out by impregnating the fine pores of porous glass preliminarily occluding various substances for imparting function in it with a decomposable compound. Then, fine pores are consolidated with a glass network structure expanded three-dimensionally (hereinafter referred to as "three-dimensional glass network structure") in fine pores formed by using the decomposable compound with which the porous glass is impregnated.

As a method of impregnating fine pores with a decomposable compound, there is usually used impregnation under vacuum.

As the decomposable compound to be contained in the fine pores, there may be used, for example, energy decomposable compounds or silicon compounds having an

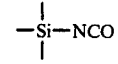

bond.

Energy decomposable compounds are compounds that can be easily decomposed by imparting an appropriate energy of an energy source to produce at least one appropriate species at an activated state by the decomposition, and the activated species thus produced being reacted with functional groups on the surface of fine pores in porous glass and with each other to be bonded in a form of network and the bonding state being expanded three-dimensionally to form a three-dimensional glass network structure in the fine pores.

From the above-mentioned compounds, there is selected and used a compound which does not disturb the function of the compound occluded in the fine pores for imparting a function to the porous glass. Preferably an energy decomposable compound is selected which adapts to the characteristics of the surface of fine pores in the porous glass or can control the state of bonding with the functional groups.

As for means to impart an energy for activating the energy decomposable compound, there may be used any means capable of activating the compound such that the decomposition of the compound is accelerated and the elements produced by the decomposition can form a three-dimensional glass network structure.

An energy is preferably imparted by a low temperature process, and therefore, an energy imparting means such as light irradiation or plasma is desired. In addition, X-ray, electron beam and the like can be used for imparting energy. In particular, a light beam source capable of scanning is a preferable energy imparting means since it can impart energy to a desired portion and it is possible to consolidate fine pores locally at desired portions.

On the other hand, where a silicon compound having an

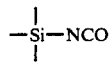

bond is used as the decomposable compound, the three-dimensional glass structure is formed by a spontaneous reaction of the silicon compound.

As an example of porous glass to which the method of consolidating pores is applied, a porous glass constituted of silica skeleton and having many fine through-pores is referred to for explaining the present invention more in detail.

The above-mentioned porous glass may be produced by treating a borosilicate glass having a desired composition with heat to separate into a sodium borate phase and a silica phase, treating the separated phases with acid, and dissolving out the sodium borate phase soluble in acid. The diameter of fine pore, pore volume, specific surface area and the like of the porous glass can be controlled by the conditions at phase separation (heat treating time, heat treating temperature, atmosphere and the like) and the conditions upon dissolving out acid (reaction temperature, reaction time, type of acid and the like).

Porous glass may be produced by hydrolyzing a suitable alkyl silicate $(Si(RO)_4$ where R is an organic group) in water or aqueous alcohol, if desired, a solution containing dispersed fine powders of silica may be used, or silica fine powders and the silica sol may be mixed, to prepare silica sol, converting the silica sol to gel, forming the gel into a desired shape, drying, and heating. The diameter of fine pore, pore pore volume, specific surface area and the like of the porous glass can be controlled by the gellation condition, drying condition and heating and firing condition.

The functional group mainly existing on the surface of pore of the porous glass is silanol group

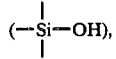

and the silanol group plays an important role in imparting a function to porous glass and consolidating pores according to the present invention.

As an energy decomposable compound with which the porous glass is impregnated, there may be used a compound of the formula, $ML_n$ (M is an element capable of forming a three-dimensional glass network structure, L is selected from various substituents, plural L's may be the same or different, and n is a natural number corresponding to the valency of M), capable of reacting selectively with silanol groups mainly existing on the surface of pore by decomposition and forming a three-dimensional glass network structure. M may be Si, P, B, As, Sb, Ge, Sn, Ti, Zr, Be, Al, Tl, Pb, In, Ga, Bi, Te, Zn, Cd and the like, and L may be hydrogen, halogen, alkyl, aryl, alkoxy, and the like. In addition, there may be used a compound of the formula, $L_mM_1-M_2L_n$ where $M_1$ and $M_2$ are the same as M as defined above, L is as defined above, m is a natural number of (valency of $M_1-1$) and n is a natural number of (valency of $M_2-1$). Furthermore, there may be used a compound of the formula, $(L_lM_1-X)_{\overline{m}}M_2L_n$ where $M_1$ and $M_2$ are the same as M as defined above, L is as defined above.

l is a natural number of (valency of $M_1-1$), m+n is a natural number corresponding to valency of $M_2$, and X is a hereto atom such as oxygen, nitrogen, sulfur and the like.

From the above-mentioned energy decomposable compounds, a compound which does not disturb the function imparted to the porous glass is selected and used.

Among the energy decomposable compounds of the formula as mentioned above, there are hydrides, halides or alkylated compounds of the element M as mentioned above or where L is hydrogen, halogen, alkyl or the like. They have high vapor pressure and are easily decomposed by imparting energy such as light irradiation, glow discharge, arc discharge and the like, and therefore, are preferable, since the process and the preparation of the starting material are easy and the storing property and handling property are good. The preferable compound includes $SiH_4$, $SiCl_4$, $SiF_4$, $Si_2H_2$, $BCl_3$, $BBr_3$, $BF_3$, $BH_3(B_2H_6)$, $Me_3B$, $PH_3$, $PCl_3$, $PBr_3$, $AsH_3$, $Me_3Al$, $Et_3Al$, $Me_3Ga$, $Me_3In$, $GeH_4$, and the like.

A porous glass is impregnated with the energy decomposable compound and an energy is imparted to the compound by any of the above-mentioned various methods, resulting in easy decomposition of the compounds and reacting with silanol groups mainly existing on the surface of fine pores of the porous glass.

The reaction may be shown as follows:

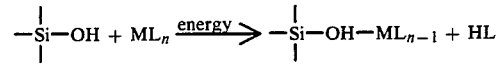

Some of the compounds have a low activation energy of the reaction and the reaction can proceed spontaneously. However, in order to proceed the reaction rapidly to consolidate the fine pores, it is necessary to impart an appropriate energy.

As the result of this reaction, the surface of fine pores of the porous glass becomes silanol group partly substituted

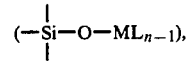

and the substituted silanol group further reacts with neighboring silanol group subsequently depending on the type of M, and thus a three-dimensional glass network structure is formed to consolidate the fine pores.

The method of consolidating fine pores of porous glass according to the present invention may be carried out by using the above-mentioned energy decomposable compound alone. However, it is preferable that a reaction-aid compound capable of activating the surface of fine pores is used together with the energy decomposable compound, or a reaction-aid compound which is not decomposed itself by the energy from the energy imparting source, but can react cooperatively with the energy decomposable compound under the conditions for effecting the pore-consolidating treatment. It is used together with the energy decomposable compound and the fine pores of porous glass is impregnated with them. Thus, the surface of fine pores of porous glass is activated to increase the reaction velocity. The consolidation can be effectively controlled and the efficiency of consolidation can be enhanced. In addition, a desired three-dimensional glass network structure can be formed in the fine pores of porous glass, and the imparted function is not adversely affected and furthermore, it is possible to increase the function.

In some cases, the substituted silanol group terminates at a certain stage not to sufficiently complete a three-dimensional glass network structure depending on the conditions.

In order to accelerate the formation of the network structure in such cases, the substituent L bonding to M of the substituted silanol groups is replaced by an appropriate substituent having a large releasing ability and containing oxygen, nitrogen, sulfur or the like to enhance the reactivity of M on the substituted silanol group and increase the reaction portions which facilitate the formation of three-dimensional network structure.

This purpose may be attained by treating the substituted silanol groups having terminated the reaction with a reaction-aid compound capable of generating a functional group which can make the reaction for the formation of three-dimensional glass network structures start again, or by coexistence of a reaction-aid compound which is not decomposed itself by the energy from an energy imparting source, can react with the energy decomposable compound (or substituted silanol groups) cooperatively under the pore-consolidating conditions.

As the reaction-aid compound, compounds containing oxygen, nitrogen, sulfur or the like are preferable, and hydrides and carbides of the above-mentioned atoms, or compounds composed of a combination of the atoms are desirable. Preferable examples of the reaction-aid compound are $O_2$, $H_2O$, $CO_2$, $NH_3$, $N_2O$, $NO$, $H_2S$, $SO_2$, $SO_3$, $CS_2$ and the like, and furthermore alcohols are effective such as MeOH, EtOH, n-PrOH, i-PrOH, n-BuOH, i-BuOH, sec-BuOH, t-BuOH and the like.

The reaction-aid compounds with a high vapor pressure are preferred from the standpoints of process, preparation of starting materials, storing property, handling property and the like.

When the reaction-aid compound is used in the coexistence with an energy decomposable compound it is desirable to dilute them so as to suppress the direct reaction between them. Such suppression may be effected by diluting them to a desired concentration with an inert gas such as nitrogen, argon, helium and the like and making them coexist. When both of them are used in combination, each of them may be separately diluted if necessary.

When the pore-consolidating treatment is effected once and the fine pores of porous glass can not be completely consolidated, the above-mentioned treatment may be repeated optionally.

On the other hand, when porous glass is impregnated with a silicon compound having an

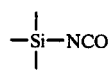

bond, the silicon compound reacts with silanol groups on the surface of fine pores of the porous glass, and precursors capable of constituting a three-dimensional network structure of glass is formed. This reaction proceeds as illustrated in formula (1) or (2), below.

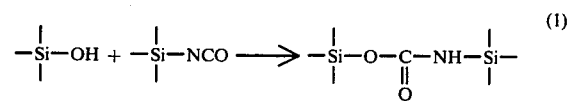 (1)

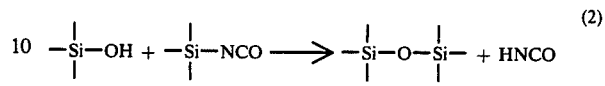 (2)

Even when the reaction proceeds as formula (1), the urethane compound decomposes to become the same compound as the product of formula (2), i.e. of

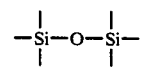

type.

Furthermore, a silicon compound having an

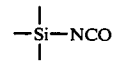

bond also reacts with a trace amount of water remaining in the fine pores of porous glass, and affords silanol which then polymerizes to produce silica. This reaction proceeds pretty fast and the by-products are $CO_2$ and $NH_3$ which are gaseous and do not have much tendency to interact with silanol. Thus, it is preferable to employ such a silicon compound.

Examples of such a siliconi compound having an

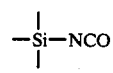

bond are not only organosilyl isocyanates such as trimethylsilyl isocyanate, dimethylsilyl diisocyanate, methylsilyl triisocyanate, vinylsilyl triisocyanate, phenylsilyl triisocyanate and the like but also tetraisocyanates or alkoxysilane triisocyanates such as tetraisocyanate silane, ethoxysilane triisocyanate, methoxysilane triisocyanate and the like. Condensation products thereof can be employed depending upon use, and those of not preventing the function imparted to porous glass can be selected to use. These silicon compounds may be diluted before use.

Aforesaid silicon compound reacts with silanol groups existing mainly on the surface of fine pores or with water remaining in fine pores to give precursors capable of forming a three-dimensional glass network structure. It is preferable to perform a post treatment such as oxidation, hydrolysis and the like in order to accelerate the reaction during the consolidation treatment of fine pores. For example, when organosilyl isocyanates are used, it is necessary to oxidize silicon by performing an oxidation treatment for oxidatively removing organic groups. Also, when tetraisocyanates or alkoxysilane triisocyanates are used, it is necessary to oxidize silicon by performing a hydrolysis treatment.

The process of those reactions are illustrated below in Formulae (3)-(5).

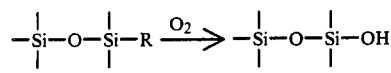 (3)

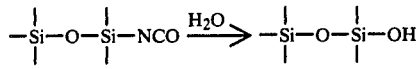 (4)

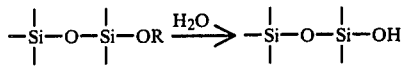 (5)

The process of Formula (3) or (4) is preferable to practice under low temperature.

To consolidate only the desired portion of porous glass, not only light beam but also known photolithography technique can be used as an energy imparting sauce. For example, photosensitive materials such as photoresists, photosetting resins and the like are provided on the desired portion of porous glass, then the desired pattern is formed on the surface of or in the porous glass by using the photolithography process, and only the desired portion is consolidated by utilizing the photoresist as a mask. When the decomposable compound is an energy-decomposable compound, the surface of porous glass is coated with a metal thin film, then the desired pattern is formed by use of photoetching, and the desired portion is consolidated by utilizing the metal thin film as a mask. Thus, it is possible to modify the embodiment depending on the manner of imparting energy.

As the consolidation treatment process of porous glass of the present invention, there can be utilized batch processes such as [A] (1)-(5), [C] (1)-(5) and continuous processes such as [B] (1)-(3) as described below:

[A]
(1) Impregnate porous glass with an energy decomposable compound in the fine pore thereof.
(2) Impart energy to cause the decomposition reaction of said decomposable compound.
(3) Change the silanol groups to the substituted silanol groups, and allow the formation of a glass network structure to proceed in the fine pores.
(4) Reactivate the portion where a glass network strucutre is not formed owing to the termination of the above reaction (3) with a reaction-aid compound.
(5) Repeat (1) through (4).

[B]
(1) Impregnate porous glass with an energy decomposable compound and a reaction-aid compound in the fine pore thereof.
(2) Impart energy to cause the decomposition reaction of said decomposable compound.
(3) Change the silanol groups to the substituted silanol groups, and allow the formation of a glass network structure to proceed in the fine pores.

[C]
(1) Impregnate porous glass with a silicon compound having

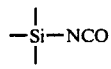

in the fine pore thereof.
(2) Change the silanol groups to the substituted silanol groups by spontaneous decomposition reaction, and allow the formation of a glass network structure to proceed in the fine pores.
(3) Remove the substantial part of the silicon compound yet to react.
(4) Reactivate the substituted silanol groups to become the silanol groups by oxidation or hydrolysis.
(5) Repeat (1) through (4).

The selection of [A] or [B] depends on the reactivity of an energy-decomposable compound with a reaction-aid compound. That is, when the reaction of both compounds is an exothermic reaction, the batch process of [A] is preferred. When the reaction of both compounds can be controlled by dilution of some extent, or when the reaction rises only upon imparting energy, the continuous process [B] is preferred since the process is easier.

In both the processes, porous glass should be demoistured enough before consolidation treatment. For this purpose, said glass in advance undergoes heating treatment for several hours at about 300° C. under reduced pressure (0.1-0.01 Torr). After cooled, under the atmosphere of inert gas, the glass undergoes consolidation treatment. Also, said glass may be treated with an energy-decomposable compound subject to react with water for the purpose of removing water. For example, $SiH_4$, $B_2H_6$, $Me_3B$, $Me_3Al$, $Et_3Al$, $GeO_4$ or the like reacts with water nd produces a hydroxide forming a glass network structure while producing hydrogen or hydrocarbons. Thus, they are effective, but it is recommended to use them being diluted since the reactions thereof often proceed violently.

In the consolidation treatment process of porous glass of the present invention, the fine pore of porous glass can be consolidated with high efficiency without any disadvantages such as reduction or vanishment of functions imparted to the porous glass owing to no requirement for high-temperature heating treatment. Furthermore, preferably in the present process, the shape of porous glass is not transformed.

EXAMPLE 1

A porous glass was heated at 300° C. for 8 hours under reduced pressure (0.1-0.01 Torr) and cooled in a stream of nitrogen. The system was then evacuated (0.1-0.01 Torr) at room temperature, and 10% monosilane gas (diluted with hydrogen) was introduced to the system at a flow rate of 100 SCCM to be occluded in fine pores of the porous glass. From the outside, through a quartz window, UV-ray irradiation was carried out for 2 minutes by the use of a 1 KW high-pressure mercury-vapor lamp. Unreacted gas was expelled, and filling with nitrogen and subsequent evacuation were repeated three times. Under reduced pressure (0.1-0.01 Torr), 1% oxygen gas (diluted with nitrogen) was then introduced. After 10 minutes, unreacted gas was expelled, and filling with nitrogen and subsequent evacuation were repeated three times. After 15-25 times repetition of the above procedure, the distributions of fine pore diameter of the porous glasses which were within a range of 40–50 Å before treatment, almost changed to below 10 Å. Light transmittances within a wave length range of 200–1500 nm were not distinguishable from those of porous glasses sintered at high temperature.

EXAMPLE 2

A porous glass was heated at 300° C. for 2 hours under reduced pressure ($10^{-6}$ Torr) and cooled in vacuo. 10% monosilane (diluted with hydrogen) and dinitrogen monoxide were then introduced to the system at room temperature at a flow rate of 100 SCCM and 10 SCCM respectively. High frequency of 13.56 MHz was applied to RF electrodes to cause a glow discharge, and plasma decomposition was carried out. During this operation, the pressure was set to 0.1–1 Torr. After 20 minutes, discharging was stopped, and then unreacted gas was expelled from the system. Subsequently, the system was refilled with nitrogen to the atomspheric pressure, and the consolidated porous glass was taken out. Light transmittance within a wave length range of 200–1500 nm was not distinguishable from those of porous glasses sintered at high temperature.

EXAMPLE 3

Under the same condition as Example 2, as a reactive gas species, 1% $B_2H_6$ (diluted with hydrogen) was also introduced together to the system at a flow rate of 100 SCCM, and plasma decomposition was carried out. As a result, fine pores of the porous glass were almost closed, and light transmittance within a wave length range of 200–1500 nm was not distinguishable from those of porous glass sintered at high temperature.

EXAMPLE 4

A porous glass was heated at 300° C. for 2 hours under reduced pressure ($10^{-6}$ Torr) and cooled in vacuo. While the porous glass was heated at 150° C., 10% monosilane (diluted with hydrogen) and anhydrous ammonia were introduced to the system at a flow rate of 100 SCCM and 10 SCCM respectively. High frequency of 13.56 MHz was applied to RF electrodes to cause a glow discharge, and plasma decomposition was carried out. During this operation, the pressure was set to 0.1–1 Torr. After 15 minutes, discharging was stopped, and then unreacted gas was expelled from the system. Subsequently, the system was refilled with nitrogen to the atmospheric pressure, and the consolidated porous glass was taken out. Light transmittance within a wave length range of 200–1500 nm was not distinguishable from those of porous glasses sintered at high temperature. Incidentally, when not heated during plasma decomposition, an article of a little inferior light transmittance was obtained.

EXAMPLE 5

A porous glass was evacuated for 8 hours under the condition of 0.1–0.01 Torr, and then a negative type resist (commercial rubber resist, e.g. EPRR) was added under reduced pressure to impregnate the porous glass therewith. After prebaking, a desired pattern was exposed through a mask. After development and rinsing, the porous glass to which the resist pattern was imparted was heated at 200° C. for 2 hours under reduced pressure ($10^{-6}$ Torr) to perform postbaking and moisture-removing of the resist. After cooled, the system pressure was set to 0.1–1 Torr. Subsequently, 10% monosilane (diluted with hydrogen) and dinitrogen monoxide was introduced to the system at a flow rate of 100 SCCM and 10 SCCM respectively, and from the outside, through a quartz window, UV-ray irradiation was performed for 20 minutes by the use of high-pressure mercury-vapor lamp. The resulting susbtrate was taken out and heated at 700° C. in an electric furnace to oxidize and remove the resist. Fine pores of the susbtrate obtained after cooling were almost closed. After immersing for 2 hours in a 6% by weight aqueous solution of cobalt nitrate and then sintering at 1150° C., a glass article colored in blue only at the resist-patterned portion thereof was obtained.

EXAMPLE 6

A porous glass was placed under reduced pressure (0.01 Torr) and immersed in a 10% tetraisocyanate silane solution in isopentane. After allowed to stand for one hour, the excess amount of isopentane and tetraisocyanate silane was removed under reduced pressure. Then, the system pressure was returned to the atmospheric pressure (RH=50%), and allowed to stand for one hour. This procedure was repeated several times. As a result, the distributions of fine pore diameter of the porous glasses, which were in a range of 56–60 Å before treatment, changed to almost below 10 Å.

EXAMPLE 7

A porous glass (1 mm thick) was dried over 8 hours under reduced pressure (0.1–0.01 Torr), and the glass article was then immersed for 16 hours in the photosetling composition A having the following composition:
Composition of composition A;
cyclohexyl acrylate: 30 wt. part
neopentylglycole diacrylate: 40 wt. part
2,2-bis(4-acryloxyetoxyphenyl)propane: 30 wt. part
benzoin isopropyl ether: 1 wt. part
Then, the glass article was taken out, and composition A was wiped off from the surface thereof.

Next, the glass article was exposed with UV-ray from an ultra-high-pressure mercury-vapor lamp (250W) for 10 seconds. UV-ray was transmitted in the direction of thickness of the glass article to polymerise the photosetting composition in the exposed portion of the glass article. After developed with acetone and then rinsed, the porous glass article to which a hardened resin pattern was imparted was placed under reduced pressure (0.01 Torr), and 10% tetraisocyanate silane solution in isopentane was added. After allowed to stand for 1 hour, the excess amount of isopentane and tetraisocyanate silane were removed in vacuo. The porous glass was placed back under the atmospheric pressure, and allowed to stand for 1 hour. After repeating this procedure several times, the glass article heated at 700° C. in an electric furnace to remove the hardened resin pattern. After cooled, the glass article was immersed in a 6% by weight aqueous solution of cobalt nitrate for 2 hours and then sintered at 1100° C. As a result, a glass article colored in blue only at the hardened-resin-patterned portion was obtained. Controlability of line width in the transparent glass portion was favorable, and a contraction rate was below 1%.

EXAMPLE 8

A porous glass (10 mm square and 3 mm thick) was dried at 300° C. under reduced pressure (0.1–0.01 Torr) over 8 hours. After cooled, the porous glass was immersed in a 0.3 M/l solution of triethyllead chloride in dichloromethane (2 ml) at room temperature for 18 hours. The glass material was teken out from the solution in dichloromethane and wiped followed by solvent removal by vacuum drying. To form a pattern of refractive index varied in the glass, the glass was exposed with UV-ray from an ultra-high-pressure mercury-vapor lamp (250 W), and the light was transmitted in the direction of thickness. In this exposing treatment, the aforementioned porous glass impregnated with triethyllead chloride was placed 50 mm away from a cut-off plate with a through hole of 0.5 mm. The light-exposed porous glass underwent elution by stirred in 5 ml acetone at room tempearture for 2 hours, and then replacing the solvent with new one, underwent elntion with stirring for another 2 hours. After treated, the porous glass was dried in vacuo and obtained a small lenswise pattern. The porous glass was heated at about 600° C. for 30 minutes to remove organic components as well as to fix the lenswise refractive index pattern in the glass After cooled, the glass material was put into a vacuum vessel, and the vessel was evacuated (0.1–0.01 Torr) at room temperature followed by occlusion of 10% monosilane diluted with hydrogen. From the outside, through a quartz window, UV-ray irradiation was carried out for several minutes by the use of 1 KW high-pressure mercury-vapor lamp. Unreacted gas was expelled and replaced by nitrogen. Evacuation and refilling with nitrogen were repeated several times, and then 1% oxygen diluted with nitrogen was introduced. After standing for a few minutes, unreacted gas was expelled, and evacuation and refilling with nitrogen were repeated several times. As the result of repetition of the above procedure several tens times, the distributions of fine pore diameter of the porous glasses, which were within a range of 40–60 Å before treatment, almost changed to below 10 Å, and transparent glass articles having a lenswise pattern at the central portion were obtained

COMPARATIVE EXAMPLE

After following the procedure of Example 8 to the step of heating at about 600° C. for 30 minutes, conventional sintering treatment by heating was carried out under the condition of 1100° C. and 7 hours and in contact with atmosphere. The resulting glass article changed to be white and opaque at the portion thereof having shown a lensewise refractive index pattern before sintering, and at this portion was found crystals of cristobalite by analysis.

What I claim is:

1. A method of consolidating fine pores of porous glass comprising impregnating fine pores of porous glass with an energy decomposable compound of the formula, $ML_n$ where M is Si, P, B, As, Sb, Ge, Sn, Ti, Zr, Be, Al, Tl, Pb, In, Ga, Bi, Te, Zn, or Cd, L is hydrogen, halogen, alkyl, aryl or alkoxy, and n is a natural number corresponding to the valency of M; and applying an energy to the decomposable compound to generate active species from the decomposable compound whereby the active species thus formed bond with each other and bond with the functional groups on the surface of the fine pores three-dimensionally to thereby form a glass network structure in the pores.

2. A method of consolidating fine pores of porous glass comprising impregnating fine pores of porous glass with an energy decomposable compound of the formula, $L_mM_1$-$M_2L_n$ where $M_1$ and $M_2$ are independently selected from Si, P, B, As, Sb, Ge, Sn, Ti, Zr, Be, Al, Tl, Pb, In, Ga, Bi, Te, Zn or Cd, L is hydrogen, halogen, alkyl, aryl, or alkoxy, m is a natural number represented by (valency of $M_1$-1), and n is a natural number represented by (valency of $M_2$-1); and applying an energy to the decomposable compound to generate active species from the decomposable compound whereby the active species thus formed bond with each other and bond with the functional groups on the surface of the fine pores three-dimensionally to thereby form a glass network structure in the pores.

3. A method of consolidating fine pores of porous glass comprising impregnating fine pores of porous glass with an energy decomposable compound of the formula

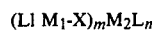
$$(L1\ M_1\text{-}X)_m M_2 L_n$$

where $M_1$ and $M_2$ are independently selected from Si, P, B, As, Sb, Ge, Sn, Ti, Zr, Be, Al, Tl, Pb, In, Ga, Bi, Te, Zn and Cd, L is hydrogen, halogen, alkyl, aryl, or alkoxy, l is a natural number of (valency of $M_1$ − 1), m + n is a natural number corresponding to the valency of $M_2$, and X is oxygen, nitrogen, or sulfur; and applying an energy to the decomposable compound to generate active species from the decomposable compound whereby the active species thus formed bond with each other and bond with the functional groups on the surface of the fine pores three-dimensionally to thereby form a glass network structure in the pores.

4. A method of consolidating fine pores of porous glass comprising impregnating fine pores of porous glass with $SiH_4$, $SiCl_4$, $SiF_4$, $Si_2H_2$, $BCl_3$, $BBR_3$, $BF_3$, $BH_3(B_2H_6)$, $Me_3B$, $PH_3$, $PCl_3$, $PBr_3$, $AsH_3$, $Me_3Al$, $Et_3Al$, $Me_3Ga$, $Me_3In$ or $GeH_4$; and applying an energy to the decomposable compound to generate active species from the decomposable compound whereby the active species thus formed bond with each other and bond with the functional groups on the surface of the fine pores three-dimensionally to thereby form a glass network structure in the pores.

5. The method according to claim 1, 2 or 3 in which the energy is a light.

6. The method according to claim 1, 2 or 3 in which the energy is a light beam capable of scanning.

7. The method according to claim 1, 2 or 3 in which the energy is X-ray or electron beam.

8. The method according to claim 1, 2, 3 or 4 in which the fine pores are impregnated with a reaction-aid compound as well as the energy decomposable compound.

9. The method according to claim 8 in which the reaction-aid compound contains oxygen, nitrogen or sulfur.

10. The method according to claim 9 in which the reaction-aid compound is a combination of at least two of oxygen, nitrogen and sulfur.

11. The method according to claim 8 in which the reaction-aid compound is $O_2$, $H_2O$, $CO_2$, $NH_3$, $N_2O$, NO, $H_2S$, $SO_2$, $SO_3$ or $CS_2$.

12. The method according to claim 8 in which the reaction-aid compound is an alcohol.

13. The method according to claim 12 in which the reaction-aid compound is MeOH, EtOH, n-PrOH, i-PrOH, n-BuOH, i-BuOH, Sec-BuOH, or t-BuOH.

14. A method of consolidating fine pores of porous glass which comprises applying a photosensitive material to the surface of porous glass, employing a photolithographic process to make a mask of a desired pattern composed of the photosensitive material, and consolidating fine pores of the porous glass by the method of claim 1, 2, 3 or 4.

15. A method of consolidating fine pores of porous glass which comprises covering the surface of the porous glass with a metal thin film, making a mask of a desired pattern composed of the metal thin film by photoetching, and consolidating fine pores of the porous glass by the method of claim 1, 2, 3 or 4.

* * * * *